(12) United States Patent
Shah et al.

(10) Patent No.: US 9,432,212 B2
(45) Date of Patent: Aug. 30, 2016

(54) DATA SWITCHING SYSTEM

(75) Inventors: Haresh K. Shah, Los Altos Hills, CA (US); Krishnamurthy Subramanian, Mountain View, CA (US); Glenn Poole, Fremont, CA (US)

(73) Assignee: DELL PRODUCTS L.P., Round Rock, TX (US)

(*) Notice: Subject to any disclaimer, the term of this patent is extended or adjusted under 35 U.S.C. 154(b) by 518 days.

(21) Appl. No.: 13/572,521

(22) Filed: Aug. 10, 2012

(65) Prior Publication Data

US 2013/0044748 A1    Feb. 21, 2013

Related U.S. Application Data

(60) Provisional application No. 61/522,505, filed on Aug. 11, 2011.

(51) Int. Cl.
| | | |
|---|---|---|
| H04L 12/66 | (2006.01) | |
| H04L 12/28 | (2006.01) | |
| H04L 12/413 | (2006.01) | |

(52) U.S. Cl.
CPC ................................. *H04L 12/413* (2013.01)

(58) Field of Classification Search
CPC .............. H04L 49/3009; H04L 19/15; H04L 2012/5652
See application file for complete search history.

(56) References Cited

U.S. PATENT DOCUMENTS

| | | | |
|---|---|---|---|
| 7,830,925 B1 | 11/2010 | Harvey et al. | |
| 2002/0049901 A1* | 4/2002 | Carvey | 713/153 |
| 2002/0099900 A1* | 7/2002 | Kawarai et al. | 710/317 |
| 2003/0035371 A1* | 2/2003 | Reed | H04L 47/12 370/230 |
| 2004/0095928 A1* | 5/2004 | O'Neill | H04L 45/02 370/389 |
| 2005/0094644 A1* | 5/2005 | Konda | 370/395.4 |
| 2009/0148162 A1* | 6/2009 | Tang | H04Q 11/0066 398/48 |
| 2009/0303880 A1* | 12/2009 | Maltz et al. | 370/235 |
| 2010/0036903 A1* | 2/2010 | Ahmad et al. | 709/202 |
| 2011/0096781 A1 | 4/2011 | Aybay | |
| 2011/0122865 A1* | 5/2011 | Androski | H04L 29/12594 370/352 |
| 2012/0314715 A1* | 12/2012 | Janardhanan | H04L 45/586 370/402 |
| 2013/0279460 A1* | 10/2013 | Kim | H04L 5/0057 370/329 |

OTHER PUBLICATIONS

PCT International Preliminary Report on Patentability and Written Opinion mailed Feb. 20, 2014, in related International Application No. PCT/US2012/050448.
PCT International Search Report and Written Opinion mailed Oct. 16, 2012, in related International Application No. PCT/US2012/050448.

* cited by examiner

*Primary Examiner* — Asad Nawaz
*Assistant Examiner* — Jason Harley
(74) *Attorney, Agent, or Firm* — Haynes & Boone, LLP

(57) ABSTRACT

A data switching system is disclosed that allows for switching of packets through a plurality of top of rack switches utilizing a logical switching fabric that includes a local TOR switching fabric on a TOR switch and a Core switching fabric on a Core switch. A method of processing packets according to some embodiment can include receiving a packet from a source port into a top of rack switch, the source port being one of a plurality of ports on the top of rack switch, processing a packet header of the packet to determine a destination port; and switching the packet through a logical switching fabric that includes a local switch fabric on the top of rack switch and a Core switching fabric on a Core switch.

15 Claims, 6 Drawing Sheets

DATA SWITCHING SYSTEM

RELATED APPLICATIONS

This application claims priority to U.S. Provisional Application No. 61/522,505, filed on Aug. 11, 2011, which is herein incorporated by reference in its entirety.

BACKGROUND

1. Technical Field

Embodiments of the present invention are related to network switching device design and more specifically to a switch fabric architecture relating to network switching devices.

2. Discussion of Related Art

With the advent of centralized locations for storing data associated with network services (retail services, financial services, communication/social networking services, database services to name only a few), network devices such as switches and routers are designed to very quickly process and route large volumes of network traffic. Such centralized locations are typically referred to as data centers.

FIG. 1 illustrates a typical topology 100 that can be used to implement such a data center. As illustrated in FIG. 1, two redundant Core switches 102, Core switches 0 and 1, are both linked to a number of Top of Rack (TOR) switches 104-0 through 104-m (collectively TORs 104). As is further illustrated, each of TOR switches 104 is linked to a plurality of servers 108 that are typically placed on racks 106. As shown in FIG. 1, TOR 104-0 is coupled to racks 106-1 through 106-n (collectively racks 106), each of which includes a plurality of servers 108. As illustrated, there can be one or more server racks 106 coupled to each of TOR switches 104, with each of server racks 106 including one or more servers 108. Each of TOR switches 104 operate to control the flow of data to and from servers 108 in each of racks 106 to which they are coupled.

TOR switches 104 and Core switches 102 illustrated in FIG. 1 can be modular devices with line card functionality, route processor functionality and switch fabric functionality that are each implemented on separate modules and coupled to a backplane within an enclosed chassis. Alternatively, all of the functional elements included in TOR switches 104 and Core switches 102 described above can be implemented on a single mother board. Depending upon the network environment in which the switches operate. TOR switches 104 and Core switches 102 can be configured to process either or both of Ethernet or IP packets.

FIG. 2 illustrates a generalized block diagram of the functional elements of a switch 200, which can be either one of TOR switches 104 or one of Core switches 102. As shown in FIG. 2, switch 200 includes one or more line cards (LC) 202, one or more route processor modules (RPM) 204, and one or more switch fabric modules (SFM) 208, all coupled to a backplane (BP) 206. The LCs 202 generally operate to receive packets or frames of information from other network devices and process the packets to determine how to forward them to their destination. The RPMs 204 generally run layer-2 or 3 network protocols that, among other things, generate information used to build and maintain switching and routing tables stored on each line card 202. The SFMs 208 generally operate to receive packet segments from the LCs 202 and then switch those packet segments so that they are distributed to their correct destination (destination LC, queue, FIFO, buffer, etc.).

In operation, a packet of information ingresses to LC 202 on switch 200 and information in the packet header is examined to determine how to propagate the packet through switch 202 to its destination (whether the destination is the same switch or a different switch). Typically, the packet is divided into segments and sent to the SFM 208 where they are switched through SFM 208 and delivered to their destination, which can be the same or different LC 202 in switch 200. The packet segments are reassembled and then transmitted by LC 202 to their destination.

Referring again to FIG. 1, when a packet ingresses to TOR 104-0 from a server 108 in Rack 106-0, for example, TOR 104-0 processes the packet header and determines whether the packet's destination is a server located in one of Racks 106 that is coupled to TOR 104-0. For example, the destination may be to a server 108 located on rack 106-n. If the destination is to a server on one of racks 106 coupled to TOR 104-0, then TOR 104-0 can forward the packet to the proper destination server 108 in that rack 106 (e.g., Rack 106-n). In the event that TOR 104-0 is running in an Ethernet environment, TOR 104-0 processes certain information included in an Ethernet header included in each packet. This processing can include a MAC lookup, IP destination address lookup, filtering using access control lists (ACLs) or any other Ethernet packet header processing. Depending upon the amount of Ethernet processing that needs to take place, more or less latency is added by TOR 104-0 in the packets path.

Continuing to refer to FIG. 1, and in an alternative scenario, in the event that TOR-0 determines that the packet received from rack 106-1 has a destination to another one of TORs 104, e.g. TOR-1 through TOR-m, then the packet is transmitted from TOR 104-0 to Core switches 102 (e.g., CS.0 or CS.0), which performs further processing on the information included in the packet's Ethernet header and subsequently forwards the packet to the correct one of TORs 104-1 through 104-m. Further packet processing occurs at the destination one of TORs 104-1 through 104-m for distribution to a correct server 108 on the correct rack 106. In this case, some or all of the information included in the packets Ethernet header can be processed three times along the packets path from the source to the destination (once at the ingress TOR (TOR-0 in the above examples), a second time at a Core switch 102 and a third time at the egress one of TORs 104-1 through 104-m), thus potentially tripling the path latency associated with Ethernet packet header processing.

Therefore, there is a need to develop improved architectures for network data switching systems.

SUMMARY

In accordance with aspects of the present invention, a method of data switching can include receiving a packet from a source port into a top of rack switch, the source port being one of a plurality of ports on the top of rack switch, processing a packet header of the packet to determine a destination port; and switching the packet through a logical switching fabric that includes a local switch fabric on the top of rack switch and a Core switching fabric on a Core switch.

In some embodiments, a top of rack (TOR) can include a plurality of ports that can each be coupled to servers on one or more racks; and network processing units coupled to the plurality of ports, the network processing unit switching packets received from the plurality of ports with a logical switching fabric, the logical switching fabric including a TOR switching fabric and a Core switching fabric accessed by the network processing units through a transceiver communicating with the Core switching fabric on a Core switch.

In some embodiments, a data center system can include at least one core switch having a core switching fabric; and at least one top of rack (TOR) switch having a TOR switching fabric, each TOR switch including a plurality of ports capable of being coupled to servers on one or more racks, the TOR switch switching a packet through a logical switching fabric that includes the core switching fabric and the TOR switching fabric.

These and other embodiments are further discussed below with respect to the following figures.

In the figures, elements having the same designations have the same or similar functions.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments of the present invention, the need to process the Ethernet packet header twice when packets are switched through a Core switch can be eliminated. Further, in some embodiments the need to build and maintain Level 2 (L2) lookup tables in the Core switch can be eliminated. In some embodiments, packets and portions of packets can be encapsulated in a special header (TOR header) for transmission from a TOR switch to a Core switch. The TOR header can include destination queue information (egress queue in destination TOR) and the identity of a lane/link over which the packet is transmitted from the TOR to the Core switch. Eliminating the need for a second Ethernet packet header processing step in the Core switch results in lower latency in the packet's path. Such an architecture is illustrated in FIG. 3.

Figure 3:
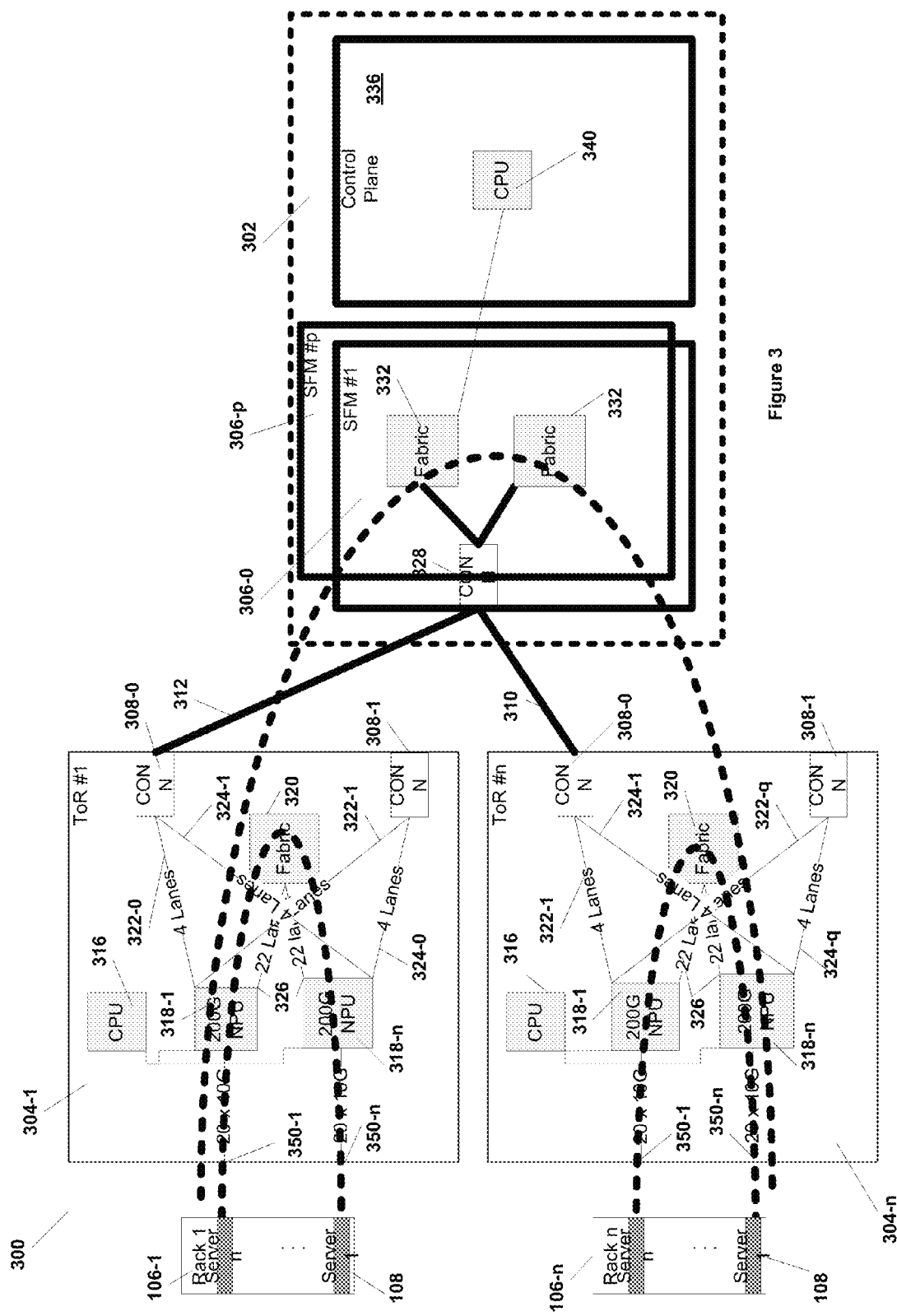
FIG. 3 illustrates a network level diagram according to some embodiments of the present invention.

FIG. 3 shows a block diagram illustrating a system 300 according to some embodiments of the present invention. As shown in FIG. 3, a number n of TORs, TORs 304-1 through 304-n (collectively TORs 304) are shown. The number n can be any number, but for purposes of an example n can be one hundred and eleven, resulting in 112 TORS (TORs 304-0 through 304-111). Each of TORs 304 can be coupled to one or more racks 106. For illustrative purposes, in FIG. 3 each of TORs 304 is coupled to a single rack 106 so that racks 106-1 through 106-n are coupled to TORs 304-1 through 304-n, respectively. In general, there can be any number of racks n coupled to each of TORs 304.

As is further shown in FIG. 3, TORs 304 include network processing units (NPUs) 318 that are coupled with racks 106. NPUs 318-1 through 318-n communicate with servers 108 on racks 106 through ports 350-1 through 350-n (collectively ports 350). Each of ports 350 can have an individual port ID that identifies the particular port. Further, each of ports 350 can receive packets (an ingress packet) from servers 108 on one of racks 106 coupled to it and can provide packets to servers 108 on one of racks 106 (an egress packet) coupled to it.

As a particular example, each of TORs 304 can be coupled to some number of servers on each of racks 106 over links that may have 20 lanes capable of 10 GHz traffic each. In some embodiments, each of racks 106 is a 42 rack unit (RU) rack, which can have 40 1RU servers where the two remaining RUs include 1RU switches. TORs 304 can include 48 ports and a number of uplink ports, so that each of TORs 304 can connected to 40 servers 108 and have some ports left over for other connectively.

As further shown in FIG. 3, each of NPUs 318-1 through 318-n is coupled to processor 316. Further, each of NPUs 318-1 through 318-n is coupled to transceivers 308 and to switching fabric 320. For illustration, transceivers 308-0 and 308-1 are shown in each of TORs 304. As is illustrated in FIG. 3, links 322-0 through 322-1 couple NPU 318-1 to transceivers 308-0 and 308-1, respectively; links 324-0 and 324-1 couple NPU 318-n to transceivers 308-0 through 308-1, respectively; links 326-1 through 326-n (shown as links 326) couple NPUs 318-1 through 318-n, respectively, to switching fabric 320. There can be any number of lanes in links 322, links 324, and links 326. In a particular example illustrated in FIG. 3, links 322 and 324 each include four (4) lanes and links 326 each include twenty-two (22) lanes.

Each of the TORs 304 include a processor 316 coupled to each of NPUs 318 that can run one or more layer-2 and/or layer-3 network protocols, including the building and maintenance of lookup tables. In particular, processor 316 can build and maintain lookup tables that provide information regarding individual ports 350 on each of TORs 304. Processor 316 can further provide general management functionality for each of the NPUs 318.

Each of the TORs 304 are coupled to each of Core switches 302. For simplification, FIG. 3 illustrates a single core switch 302, although any number of core switches 302 can be included. Core switches 302 includes SFMs 306-0 through 306-p. In some particular examples, p can be 3 so that there are four SFMs 306 in Core switch 302-0. In general, there can be any number of SFMs 306 in each of Core switches 302. Each of SFMs 306 includes one or more switching fabric elements 332 and a number of transceivers 328, of which a single transceiver 328 is illustrated. In general, each of Core switches 302 can have a different number of SFMs 306, each with a different number of transceivers 328.

As shown in FIG. 3, transceivers 308 are coupled to one of transceivers 328 of Core switches 302. For example, as shown in FIG. 3, transceiver 308-0 of TOR 304-1 communicates with transceiver 328 of SFMs 306 in switch 302 over links 312. Similarly, transceiver 308-1 of TOR 304-n communicates with transceivers 328 of SFMs 306 in switch 302 over links 310 Each of links 312 and 310 can be identified with both a link identification and an identification of each of the individual lanes within the links.

Transceivers 308-0 and 308-1 of TORs 304-1 through 304-*n* are coupled to transceivers 328 in switches 302. There may be any number of Core switches 302. The number of transceivers 308 can be arranged such that, for each of TORs 304-1 through 304-*n*, one transceiver 308 is utilized to communicate with one of Core switches 302. In some embodiments, transceiver 308-0 can be a QSFP transceiver and transceiver 308-2 can be a CXP transceiver. Each of links 310 and 312 can contain multiple lanes, with each lane including two unidirectional links, one from TOR to Core and one from Core to TOR. Each of transceivers 308 and 328 can be SERDES transceivers that terminate each end of a twisted pair, optical transceivers, or can be some other high speed transmission line.

As is illustrated in FIG. 3, each of TORs 304 is coupled to each of SFMs 306-0 through 306-*p* in each Core switches 302. With each of SFMs 306 including four SFMS 306, for example, two Core switches 302 form eight switch fabric modules (two groups of four SFMs 306). TORs 304 communicate with transceivers 328 over links 310 and 312. The SFMs 306 together form a redundant Core Fabric plane. Each SFM 306 is comprised of one or more fabric elements 332, each of which can be a N×N crossbar switch (with N being an integer) for example. Each set of SFMs 306 is coupled to a control plane 336 that includes a processor 340 and possibly other functional circuitry. Processor 340 in this case provides general management functionality to each of SFMs 306, but does not need to provide level 2 or level 3 functionality.

In operation, a packet ingressing to any one of TORs 304 from a server on one of racks 106 can be either switched locally through fabric 320 within that one of TORs 304, or it can be forwarded by that TOR 304 to a Core switch 302, propagated through the Core switch fabric 332, and be transmitted to another one of TORs 304. In the later case, information in the Ethernet header of the packet is processed only once in one of NPUs 318 of TORs 304 before the packet is sent to a Core switch 302. As can be seen in FIG. 3, core plane 336 may not include any layer-2 or layer-3 network protocol functionality, and each of SFMs 306 need not perform any Ethernet packet header processing functionality.

In effect, system 300 includes a single layer logical switching fabric that includes switching fabric 320 in TORs 304 and switching fabrics 332 of Core switches 302. Packets received into TORs 304 from racks 106 are processed in NPUs 318 and switched in the single layer logical switching fabric formed by fabric 320 and SFMs 306 accordingly. As discussed below, the packets transmitted to Core switches 302 for switching in switching fabrics 332 include specific headers added by NPUs 318 that control switching in fabrics 332. Therefore, no network packet header processing is performed in switches 302.

Figure 4:
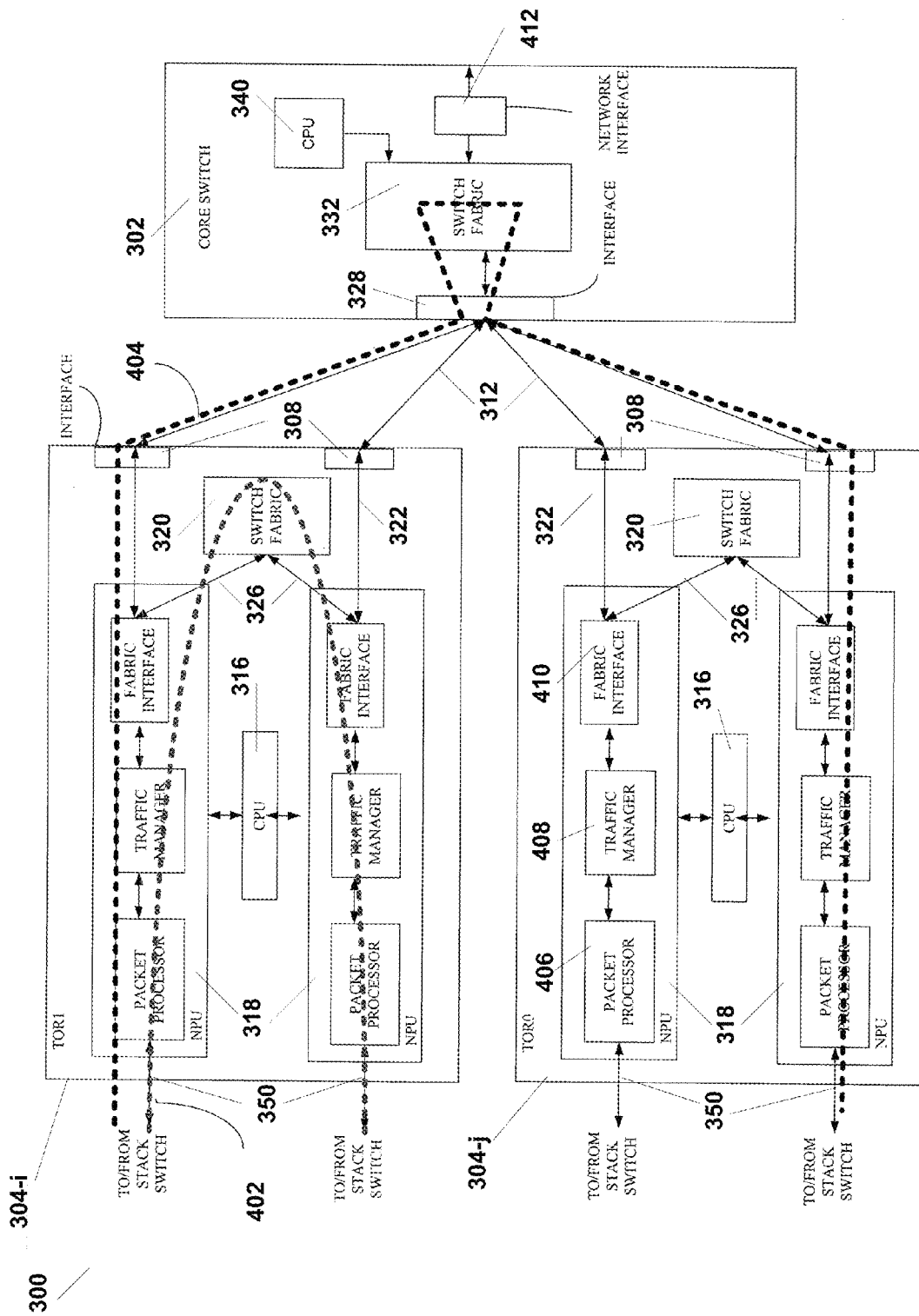
FIG. 4 illustrates further detail of the network level diagram shown in FIG. 3.

FIG. 4 further illustrates system 300 of FIG. 3. For simplification, only two TORs 304 are illustrated, designated TOR 304-*i* and 304-*j* for convenience. Further, only one Core switch 302 is illustrated. As shown in FIG. 4, switch fabric 332 is representative of switch fabric 332 in each of SFMs 306. As shown, switch fabric 332 is coupled to processor 340, which provides general management functionality for switching fabric 332. As is further shown in FIG. 4, switch 302 may include a network interface 412 that couples to an outside network.

As is further illustrated in FIG. 4, TORs 304 include NPUs 318, processor 316, switching fabric 320, and transceivers 308 as discussed above. NPUs 318 include a packet processor 406, traffic manager 408, and fabric interface 410. As discussed above, switching fabric 320 and switching fabric 332 form a single-layer logical switching fabric.

For convenience, two random TORs, TORs 304-*i* and 304-*j*, are illustrated in FIG. 4. Each of TORs 304-*i* and 304-*j* is illustrated for convenience to include two NPUs 318, although each of TORs 304 can include any number of NPUs 318. Each of NPUs 318 includes a packet processor 406, a traffic manager 408, and a fabric interface 410. As described with FIG. 3, NPUs 318 interact with transceivers 308 and switch fabric 320. For convenience, link 322 is illustrated to transceiver 308 and links 326 are illustrated to switch fabric 320. Packet processor 406, traffic manager 408, and fabric interface 410 can be implemented as software operated on a processor, by hardware functions, or by a combination of software and hardware components.

Packet processor 406 generally functions to examine information included in an Ethernet header appended to a packet of information and to use this information to perform various lookup operations using information included in tables (not shown). Packet processor 406 can operate to encapsulate an Ethernet packet or a portion of an Ethernet packet in a special header (TOR header) for transmission to Core switch 302.

Traffic manager 408 can include packet buffers and queues to temporarily store packets or packet segments prior to their being forwarded to fabric interface 410. Traffic manager 408 can also include functionality that operates to de-queue the packet information according to a pre-determined schedule or according to rules associated with quality of service.

Fabric interface 410 functions to direct packet information to either fabric 320 on TOR 304, if the packet destination is an egress port/queue on the same TOR 304, or to switch fabric 332 located on Core Switch 302, if the packet destination is an egress port/queue on another one of TORs 304. Processor 316 included on each of TORs 304 can operate to run a number of level 2 (L2) or level 3 (L3) network protocols, which operate to generate information that is used to build and maintain L2/L3 lookup tables utilized by packet processor 406. Processor 316 can be responsible for the overall management of operational aspects of TOR 304, for example fan control and device configuration.

As illustrated in FIG. 4, fabric interface 410, which can be comprised of one or more SERDES devices, is coupled to fabric 320 and to transceiver 308, which is coupled to fabric 332 on Core switch 302 through transceiver 328. As illustrated in FIG. 4, fabric interfaces 410 on each of the NPUs 318 can be coupled by links 326 to fabric 320 utilizing SERDES devices. Further, fabric interfaces 410 one each of NPUs 318 can be coupled by links 322 to transceivers 308 utilizing SERDES devices. As discussed above, Core switch 302 includes switch fabric 332, as described earlier with reference to FIG. 3, and a processor 340. Core switch 302 can also include one or more SERDES interface devices, such as transceivers 328, that link switch fabric 332 on Core switch 302 to TORs 304. As illustrated in FIG. 4, Core switch 302 can be interfaced to an external network (e.g., external to the data center system 300) through network interface 412, which also can include SERDES interface devices.

FIG. 4 further illustrates example paths for packets. As shown in FIG. 4, path 402 illustrates a data packet that ingresses through one of NPEs 318 in a single TOR 304, TOR 304-*i* in FIG. 4, and egresses through another one of NPEs 318 in the same TOR 304, TOR 304-*i* in FIG. 4. Path 404 illustrates a data packet that ingresses through one of NPEs 318 in a first one of TORs 304, TOR 304-*i*, and is directed through Core switch 302 to a second one of TORs 304, TOR 304-*j*. As described earlier, by encapsulating the packet involved in path 404 in a special Ethernet packet/segment header (TOR header), the need to perform Ethernet processing in Core switch 302 is eliminated, and so the additional latency associated with Ethernet packet processing at Core switch 302 is eliminated.

Figure 1:
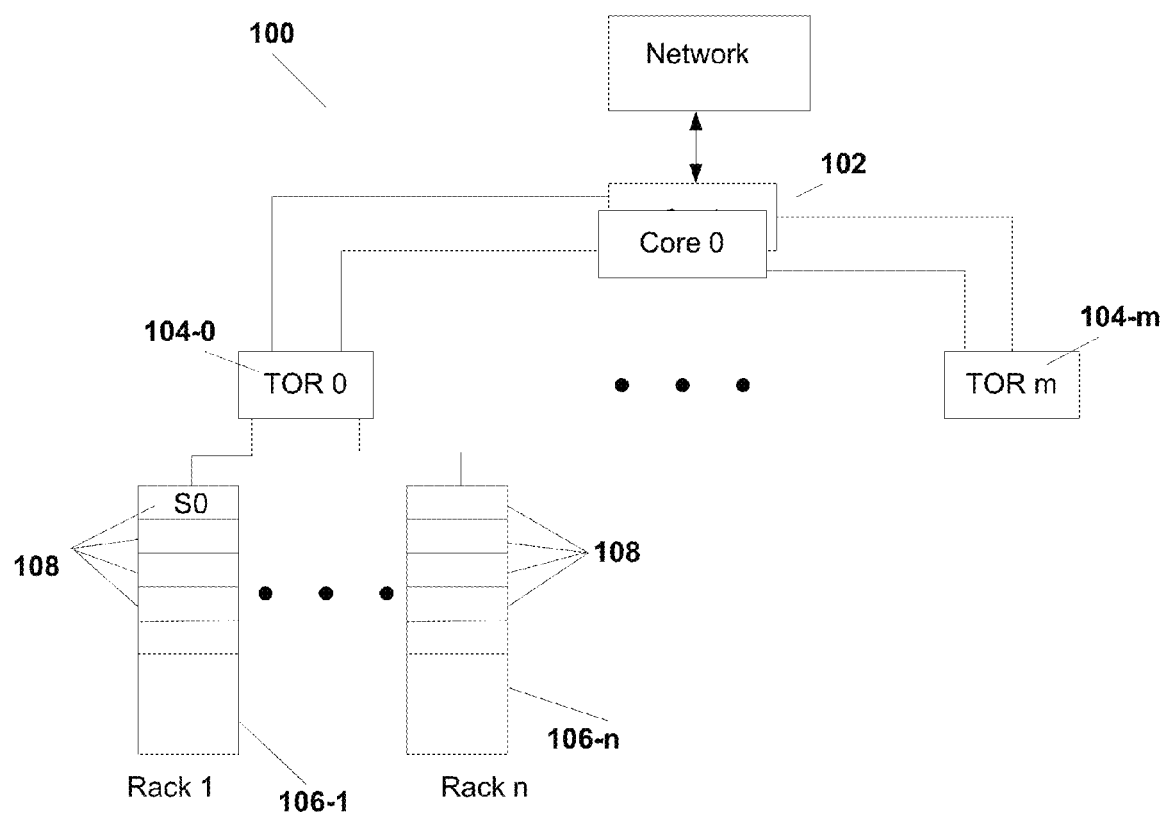
FIG. 1 illustrates a network diagram for a conventional data center topology.
Figure 2:
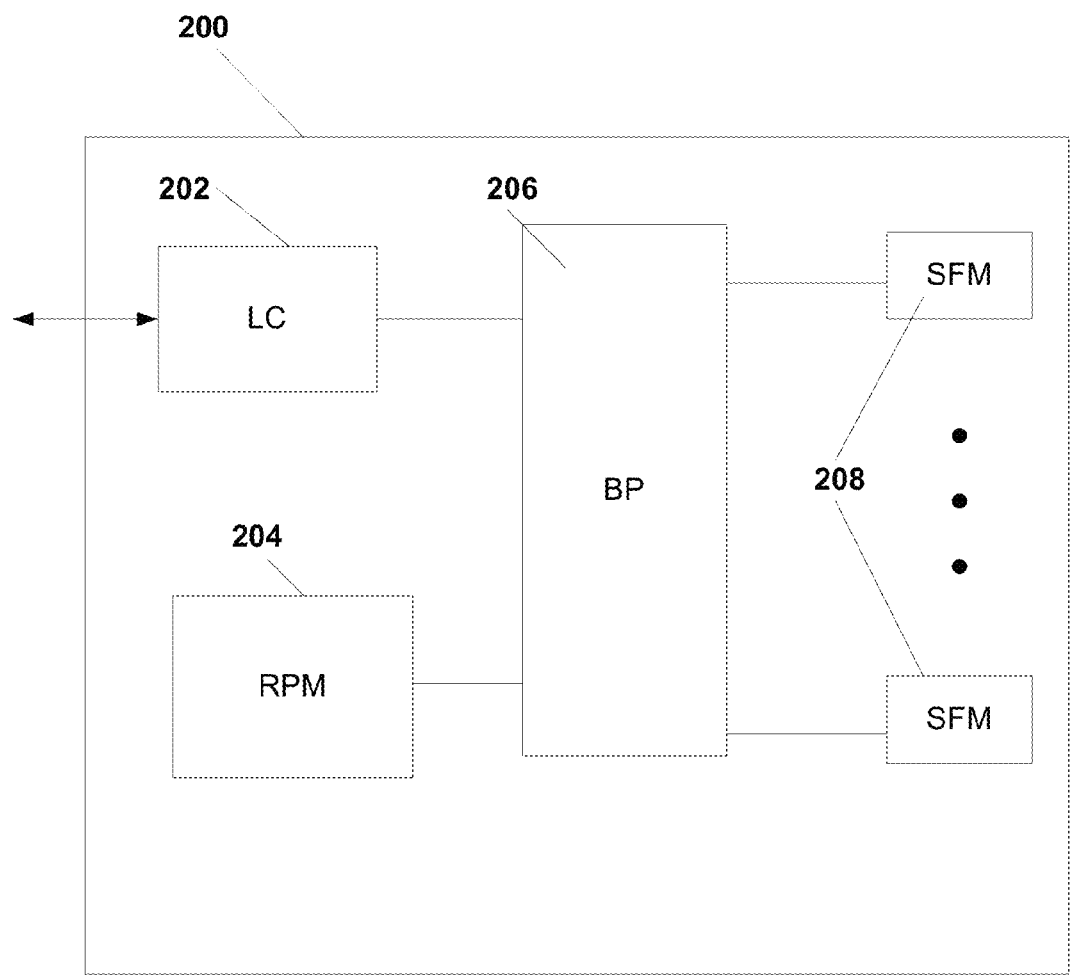
FIG. 2 shows a block diagram of a conventional TOR or Core switch.

Therefore, as is illustrated in FIGS. 3 and 4, a single layer logical switching fabric is physically distributed between switch fabric 320 on TOR 304 and switch fabric 332 on Core switch 302. In some embodiments, this arrangement allows for significantly higher network scalability compared to conventional, centralized switching fabrics as illustrated in FIGS. 1 and 2. Switch fabric 320 on TOR 304 provides full non-blocking forwarding for locally switched data traffic view the local logical switch fabric while switch fabric 332 provides high scalability across many TORs 304. The local switching through switch fabric 320 allows links to core switching fabric 332 to be over subscribed independently of links in TOR fabric 320. The decoupling between TOR fabric 320 and Core fabric 332 enables optimal link utilizing and can greatly increase network scalability.

Figure 5A:
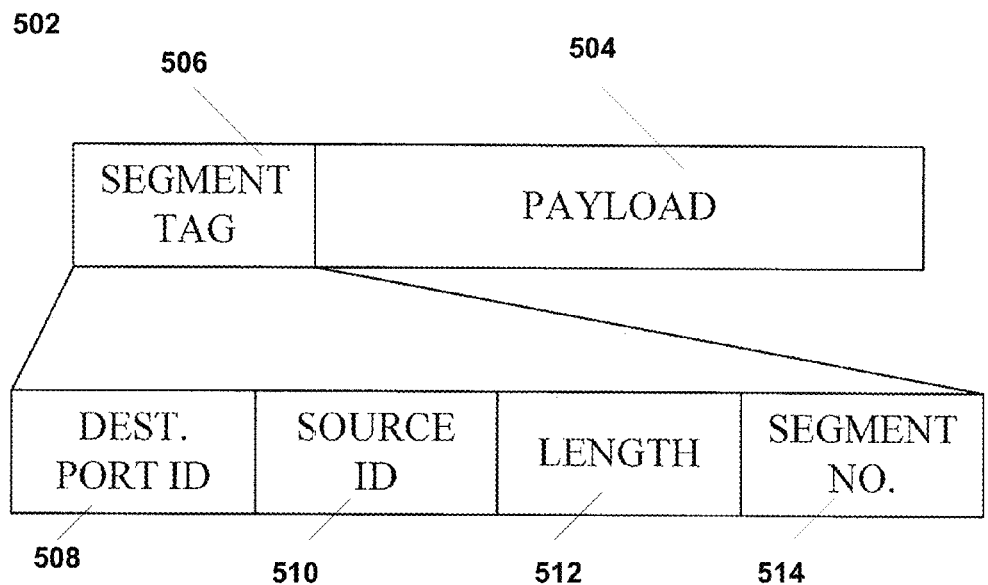
FIG. 5A illustrates an Intra-TOR packet segment according to some embodiments of the present invention.
Figure 5B:
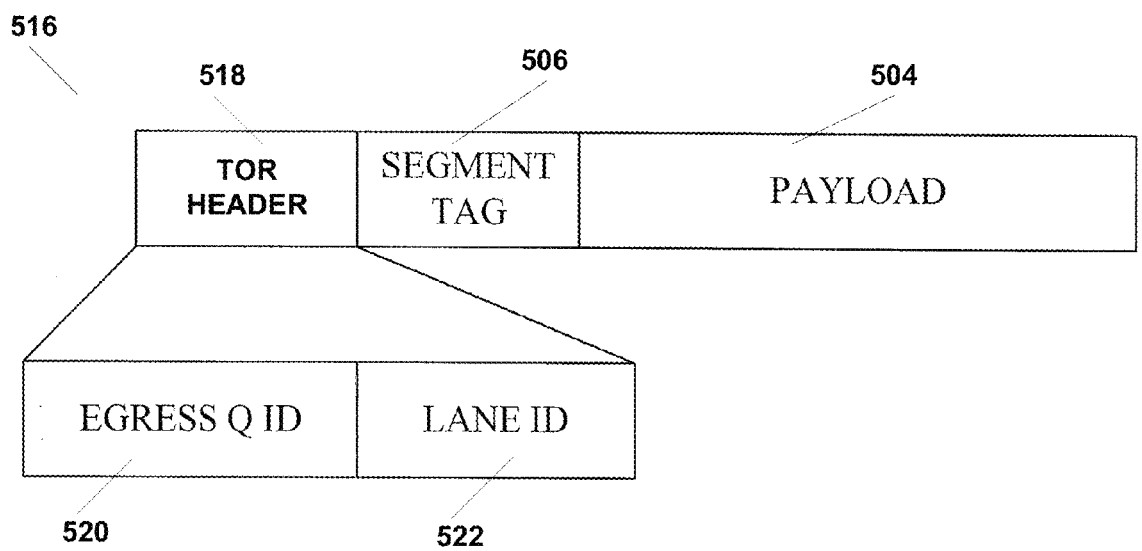
FIG. 5B illustrates an Inter-TOR packet segment according to some embodiments of the present invention.

The format of packet/segments passing over paths 402 and 404 are illustrated in FIGS. 5A and 5B, respectively. The packet 502 shown in FIG. 5A includes a payload portion 504 and a segment tag portion 506. Payload portion 504 can include a standard Ethernet packet with or without header information removed or modified, which is received from rack 106 into an NPU 318 on a TOR 304. Segment tag portion 506 can include a destination port ID 508, a source port ID 510, a segment length 512 and a segment number 514. The destination port ID can include the identity of a destination port 350 associated with a TOR switch 304 and the source port ID can include the identity of a source port 350 associated with the same TOR switch 304 or a different TOR switch 304.

The packet segment 516 illustrated in FIG. 5B can be comprised of all of the information included in segment format 502 described with reference to FIG. 5A, and it can include a special header (TOR header) 518. TOR header 518 includes an egress queue identity and a link identity. The egress queue identity is the identity of an egress queue located on a Core switch 332 and the link identity is the identity of a link 312 or 310 associated with the egress port that links Core switch 302 to a destination TOR switch 304. The packet segment of FIG. 5B includes all of the information needed by a Core switch 302 to propagate packet segment 516 through its switch fabric 332 and to the proper egress port in transceiver 328 for transmission over a link 312 or 310 to the destination TOR 304.

As a particular example, a packet from a rack 106 through path 402 shown in FIG. 4 can be described. The packet is received by packet processor 406 in a source port 350 coupled to rack 106 and provided to a first NPU 318 of TOR 304-*i*. The first NPU 318 processes the header of the packet and determines that the destination for the packet is to a rack 106 coupled to a destination port 350 of the same TOR 304-*i*. The NPU 318 then segments the packet into multiple segments and builds a number of segmented packets 502 having a payload 504 that is part of the packet received from rack 106 and builds segment tag 506 that includes the destination port ID 508 corresponding to the destination port 350, the source port ID 510 corresponding with the source port 350, the length of the segment packet 512, and the segment number 514 and forwards the segmented packet to traffic manager 408. Traffic manager sends the segmented packet 502 to fabric interface 410, which sends segmented packet 502 to switch fabric 320. Switch fabric 320 switches the segmented packet according to the destination port ID 508 to another NPU 318 of the same TOR 304-*i*, which removes segment tag 506 and rebuilds the originally received packet for transmission to the rack 106 that is coupled to the destination port 350 associated with the destination port ID 508.

Following path 404, a packet from a first rack 106 is received by packet processor 406 of a first NPU 318 of TOR 304-*i* through a source port 350 coupled to rack 106. The first NPU 318 processes the header of the packet in packet processor 406 and determines that the destination for the packet is to a rack 106 coupled to a destination port 350 of a different one of TORs 304, TOR 304-*j* in FIG. 4. Packet processor 406 then segments the packet into multiple segments and builds a number of segmented packets 502 having a payload 504 that is part of the packet received from the first rack 106. Packet processor 406 also builds segment tag 506 that includes the destination port ID 508 corresponding to the destination port 350, the source port ID 510 corresponding with the source port 350, the length of the segment packet 512, and the segment number 514. Packet processor 406 then builds TOR header 518 that includes the egress Q ID 520 and link ID 522 and forwards the segmented packet to traffic manager 408. Traffic manager sends the segmented packet 502 to fabric interface 410, which sends segmented packet 516 to switch fabric 332 on Core switch 302 over link 312. Switch fabric 332 switches the segmented packet 516 according to the egress Q ID 520 and link ID 514 to the destination TOR 304-*j*. Destination TOR 304-*j* receives segmented packet 516 into a NPU 318 of destination TOR 304-*j*, which removes header 518 and segment tag 506 and rebuilds the originally received packet for transmission to the rack 106 that is coupled to the destination port 350 associated with the destination port ID 508.

Figure 6:
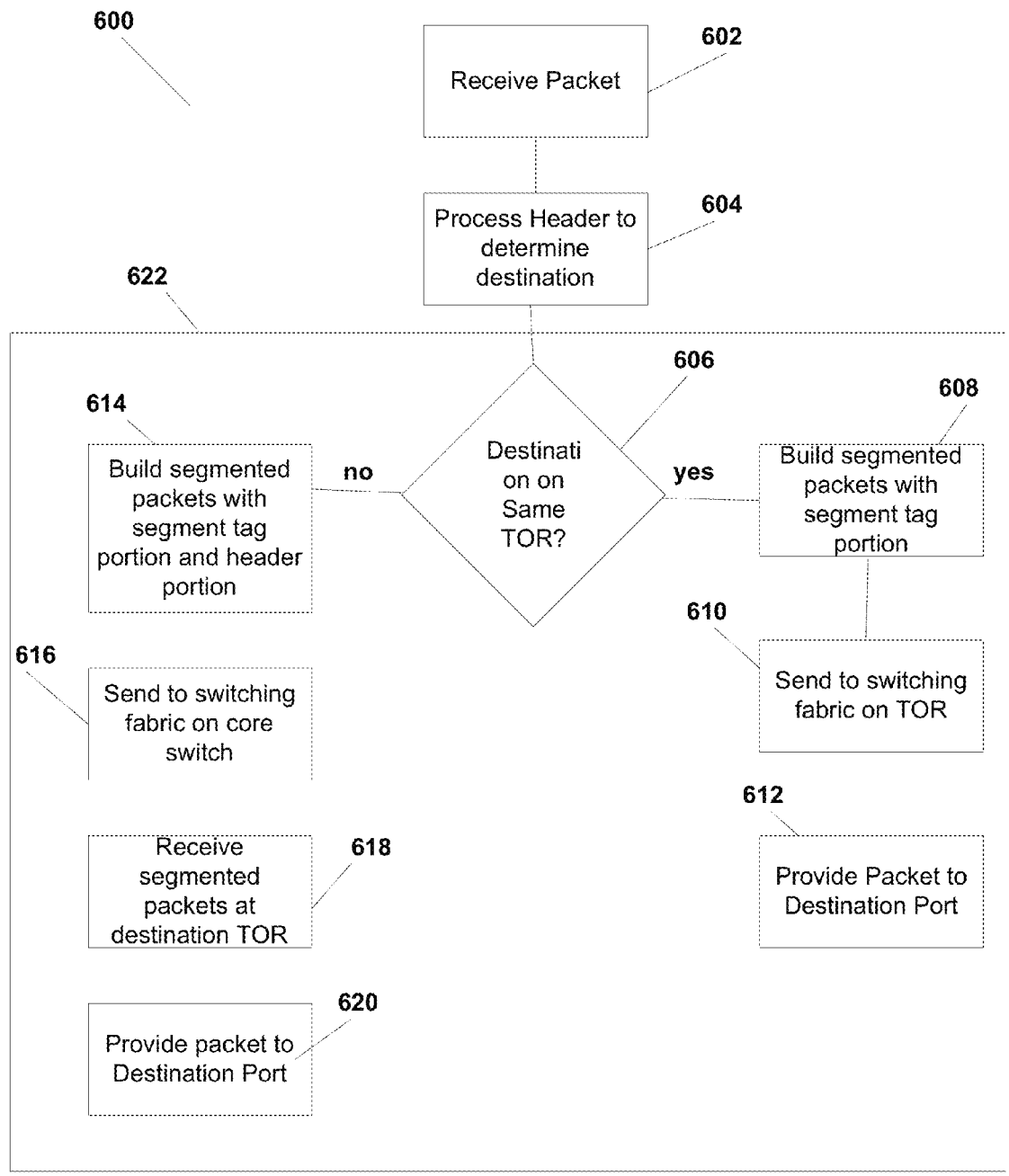
FIG. 6 illustrates a method of processing packets according to some embodiments of the present invention.

FIG. 6 further illustrates a method 600 according to some embodiments of the present invention. As shown in FIG. 6, in step 602 a packet is received at a port 350, the source port, in a TOR 304, the source TOR. In step 604 NPU 318 of the source TOR 304 associated with the source port 350 processes the header to determine the port 350 where the packet is destined, the destination port 350. In step 622, the packet is switched through a logical switch fabric to the destination port 350. Switching with the logical switch fabric is discussed with respect to steps 606 through 620 below.

In step 606, NPU 318 determines whether the destination port 350 is on the same TOR 304 (the source TOR) or another of TORs 304. If yes, then method 600 proceeds to step 608, where the NPU 318 builds a segmented packet 502 as described above. In step 610, segmented packet 502 is provided to switching fabric 320 on the same TOR 304, which directs the segmented packet to the destination port 350. In step 612, the packet that was originally received is provided to the destination port 350.

If in step 606 the destination port 350 is not on the same TOR 304, then in step 614 NPU 318 builds segmented packets 516 as described above. In step 616, the same TOR 304 forwards the segmented packet 516 to a Core switch 302. In step 618, the destination TOR 304 receives the segmented packets 516 from the Core switch 302. In step 520, the packet is provided to the destination port 350.

The above detailed description is provided to illustrate specific embodiments of the present invention and is not intended to be limiting. Numerous variations and modifications within the scope of the present invention are possible. The present invention is set forth in the following claims.

What is claimed is:

1. A method of data switching, comprising:
   receiving a packet from a source port into a top of rack (TOR) switch, the source port being one of a plurality of ports on the top of rack switch, the plurality of ports capable of being coupled to a plurality of servers on one or more racks;
   processing a packet header of the packet to determine a destination port;
   determining whether the destination port is on the TOR switch;
   segmenting the packet to provide segmented packets to a logical switching fabric that includes a local switch fabric on the top of rack switch and a Core switching fabric on a Core switch;
   when the destination port is on the TOR switch, providing the segmented packets without a TOR header to the local switch fabric;
   when the destination port is on a different TOR switch, providing the segmented packets with the TOR header to the Core switch fabric, wherein the TOR header eliminates a need to processes the packet header to determine the destination port at the Core switch; and
   switching the segmented packets through the logical switching fabric.

2. The method of claim 1, wherein switching the segmented packets through the logical switching fabric includes providing the segmented packets with a segment tag.

3. The method of claim 2, wherein the segment tag includes a destination port ID, a source port ID, a length, and a segment number.

4. The method of claim 2, wherein the segmented packets each include a payload, the payload being at least a portion of the packet.

5. The method of claim 2, wherein the TOR header includes an egress Q ID and a Lane ID.

6. The method of claim 2, further including providing the segmented packets to a traffic manager.

7. The method of claim 6, further including providing the segmented packets to a fabric interface coupled to the logical switch fabric.

8. A top of rack (TOR), comprising:
   a plurality of ports that can each be coupled to servers on one or more racks; and
   network processing units coupled to the plurality of ports, the network processing unit switching packets received from the plurality of ports with a logical switching fabric, the logical switching fabric including a TOR switching fabric and a Core switching fabric accessed by the network processing units through a transceiver communicating with the Core switching fabric on a Core switch,
   wherein the network processing units are configured to:
   receive a packet from a source port, the source port being one of the plurality of ports;
   process a packet header of the packet to determine a destination port;
   determine whether the destination port is one of the plurality of ports;
   segment the packets to provide segmented packets to the logical switching fabric;
   when the destination port is one of the plurality of ports, provide the segmented packets without a TOR header to the TOR switch fabric; and
   when the destination port is on a different TOR, provide the segmented packets with the TOR header to the transceiver for switching with the Core switch fabric, wherein the TOR header eliminates a need to processes the packet header to determine the destination port at the Core switch; and
   switch the segmented packets through the logical switching fabric.

9. The TOR of claim 8, wherein the network processing units operate to switch the packet through the logical switching fabric by
   providing the segmented packets with a segment tag.

10. The TOR of claim 8, wherein the network processing units include
    a packet processor that provides the segmented packets;
    a traffic manager that receives the segmented packets from the packet processor; and
    a fabric interface that receives the segmented packets from the traffic manager and directs the segmented packets into the logical switching fabric.

11. The TOR of claim 9, wherein the segment tag includes a destination port ID, a source port ID, a length, and a segment number.

12. The TOR of claim 9, wherein the segmented packets each include a payload, the payload being at least a portion of the packet.

13. The TOR of claim 9, wherein the TOR header includes an egress Q ID and a Lane ID.

14. A data center system, comprising:
    at least one core switch having a core switching fabric; and
    at least one top of rack (TOR) switch having a TOR switching fabric, each TOR switch including a plurality of ports capable of being coupled to servers on one or more racks, the TOR switch switching a packet through a logical switching fabric that includes the core switching fabric and the TOR switching fabric,
    wherein the TOR switch is configured to:
    receive the packet from a source port, the source port being one of the plurality of ports;
    process a packet header of the packet to determine a destination port;
    segment the packets to provide segmented packets to the logical switching fabric;
    when the destination port is one of the plurality of ports, provide the segmented packets without a TOR header to the TOR switch fabric;
    when the destination port is on a different TOR switch, provide the segmented packets to the Core switch fabric, wherein the TOR header eliminates a need to processes the packet header to determine the destination port at the Core switch; and
    switch the segmented packets through the logical switching fabric.

15. The data center of claim 14, wherein the TOR switch operates to switch the segmented packets through the logical switching fabric by providing the segmented packets with a segment tag.

* * * * *